United States Patent [19]

Ioannou

[11] Patent Number: 4,820,917
[45] Date of Patent: Apr. 11, 1989

[54] STRESS AND TEMPERATURE MAPPING USING AN ARRAY OF OPTICAL FIBERS AND CHARGE COUPLED DEVICES

[75] Inventor: John T. Ioannou, Murrysville, Pa.

[73] Assignee: Aluminum Company of America, Pittsburgh, Pa.

[21] Appl. No.: 135,056

[22] Filed: Dec. 18, 1987

[51] Int. Cl.$^4$ .................. H01J 5/16; G01K 11/00
[52] U.S. Cl. .................. 250/227; 250/231 R; 374/162
[58] Field of Search .......... 250/227, 231 R, 231 P; 73/763, 767; 356/73.1; 374/162

[56] References Cited

U.S. PATENT DOCUMENTS

| | | | |
|---|---|---|---|
| 4,188,087 | 2/1980 | D'Auria et al. | 250/227 |
| 4,477,725 | 10/1984 | Asawa | 250/231 R |
| 4,654,520 | 3/1987 | Griffiths | 250/231 R |

Primary Examiner—David C. Nelms
Assistant Examiner—Stephone B. Allen
Attorney, Agent, or Firm—Elroy Strickland

[57] ABSTRACT

A fiber optic core cladded with a material having an index of refraction lower than the core material and light sensing means located along the length of the core and cladding material. The sensing means receives light which escapes into the cladding from the core when the fiber optic is stressed, and produces an output in response to light received. Measurement of the output provides both magnitude and location information with respect to stresses in the fiber optic. A measurement of fiber temperature by detection of dark current, which is the function of temperature, is effected in pixels of the sensing means located in intimate contact with the fiber. An accurate measurement of stress in the fiber is made by subtracting dark current measurements from stress measurements when the fiber optic is excited with light.

11 Claims, 1 Drawing Sheet

STRESS AND TEMPERATURE MAPPING USING AN ARRAY OF OPTICAL FIBERS AND CHARGE COUPLED DEVICES

FIELD OF THE INVENTION

This invention relates to monitoring stress and temperature distributed along an array of optical fibers The array can be integrated into a composite sheet, and stress patterns in the sheet mapped in x-y directions. The optical fibers may also be used to monitor stress, movement, and temperature of objects to which the optical fibers are attached or embedded.

BACKGROUND OF THE INVENTION

In the prior art of measurement of mechanical stress, monitoring of physical movement, and measurement of temperature of physical objects, it is known to place a sensing means along the length of the object to be measured U.S. Pat. No. 4,654,520 to Griffiths discloses the use of an optical fiber which is securely fastened to a long, continuous structure such as a pipe line. Light is passed into an end of the optical fiber and any physical movement of the structure including deflection, bending, displacement or fracture produces changes in the optical fiber which can be measured by means of reflection of light from the fiber, or by means of light which is passed through the fiber to the other end.

In Griffiths, the detecting means measure and display in the time domain the reflected intensity from various points along the fiber. This technique is based upon changes in reflection (Rayleigh backscattering) and detection of light that is passed completely through the fiber. All of the measurement techniques are dependent upon the ability to measure accurately the light emanating from the optical fiber end.

The Griffith approach falls into the general category of optical time domain reflectometry. A short pulse is launched down the fiber and a sensor detects the light continuously backscattered by the fiber core. The exponential attenuation rate of a fiber of this type is normally known. Stresses applied to the fiber will cause a drop in light intensity at the location of each stress, and the stress amplitude and its location can be determined.

The optical time domain reflectometry approach suffers from the weakness that the backscattered signal is normally small and the signal reflected out of the fiber optic core is small. The measure of stresses in tens of meters of fiber length requires a transmitted optical pulse of a few nanoseconds in length. Such narrow pulses limit the magnitude of the energy that can be put into such a fiber.

Interferometry may also be used with fiber optics to detect stress or changes in the optical fiber. The signal in the sensing fiber is compared to the signal in a reference fiber and any phase shift between the two measured. This phase shift is sensitive to sensing fiber elongation (strain) and to changes in light velocity, as for example affected by the refractive index.

The weaknesses of the interferometer approach are (1) implementation is mechanically very delicate and (2) changes in fiber temperature result in strain changes. Thus, changes in fiber temperature appear as stress changes. The nature of the measurement is not distributive along the fiber, but it is a net, cumulative effect. Multiple stresses along the fiber cannot be resolved either in amplitude or in location.

SUMMARY OF THE INVENTION

This invention uses an optical fiber which consists of a solid silica core material clad with another silica material. In such optical fibers, the key is that the core material is a good conductor of light waves, and has an index of refraction higher than the cladding index of refraction. This establishes a critical angle below which light rays entering the fiber are totally reflected off the core-cladding boundary and remain within the core unable to escape into the cladding.

Whenever such an optical fiber is mechanically stressed at any point along its length, some quantity of light traveling through the fiber will escape from the core and into and through the cladding. Often referred to as "microbending", this causes the critical angle of the light in the core to be exceeded and the index of refraction of the core material to be changed.

In the present invention, the light escaping into the cladding from a stressed microbend is sensed in magnitude and position along the fiber by means of charged-coupled device (CCD) technology. A CCD consists of a series of individual stages, referred to as pixels, each of which can detect incoming light level, convert the light energy to an analog electrical charge, upon command transfer that charge to a shift register stage of the CCD, and upon command serially shift that charge through an amplifier resulting in a video output signal. The video signal representing the series of pixels is an amplitude replica of the light profile detected by the pixels. The CCD is geometrically integrated along with the cylindrical surface of the fiber cladding. The optical fiber is thereby intimately coupled to the CCD sensors distributed along the length of the optical fiber. Light emitted along the fiber is sensed by the CCD array. The width of the CCD pixels is determined by the desired stress resolution. The light detected by the CCD array is spatially stored along the length of the fiber as analog data. This spatially stored CCD analog data is transferred to the charge-coupled analog shift register within the CCD which serially shifts out (bucket-brigade) the data to a single output line.

No external wiring is required between CCD pixels, as all necessary interconnections are accomplished within integrated circuitry of the CCD.

The light passing through the cladding and into the CCD pixels represents an amplitude measurement at the output of the shift register. A given amplitude along with its associated pixel number yields the precise magnitude and location of a stress condition.

The invention also contemplates the use of an optical fiber having a CCD located on its surface for measurement of temperature. As explained in detail hereinafter, temperature measurements can be made by accumulating dark currents in the CCD pixels and the CCD output measured as described above.

By the use of CCD technology to detect light escaping from a fiber optic, two-dimensional stress mapping of a surface giving both amplitude and location of multiple stresses existing within the surface can be made. The response time of the CCD technology is sufficiently fast to allow mapping of dynamic stress.

DETAILED DESCRIPTION OF A PREFERRED EMBODIMENT

Figure 1:
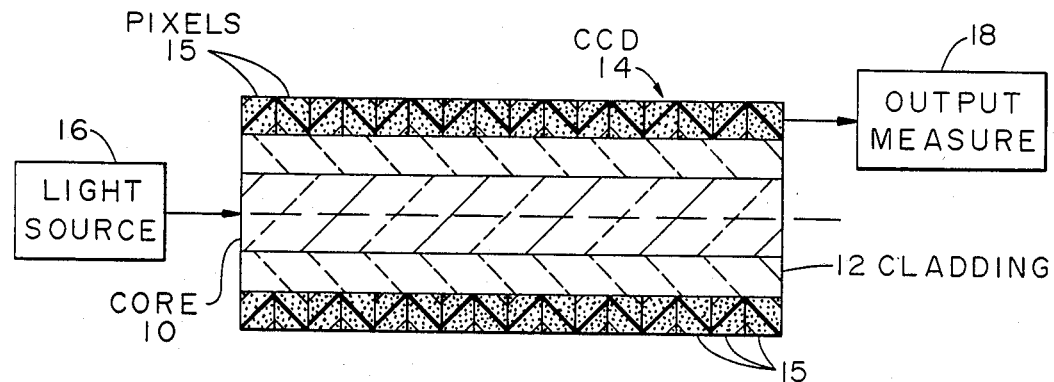
FIG. 1 shows a longitudinal section of an optical fiber having a cladding and CCD located thereon.
Figure 2:
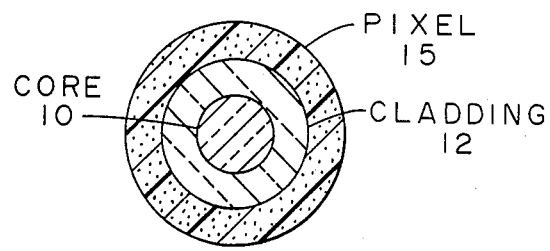
FIG. 2 is a cross sectional view of the fiber and CCD of FIG. 1. A CCD pixel is shown circumscribing the optical fiber; however, depending upon the direction of the applied stresses, it may not be necessary to completely circumscribe the fiber.

FIG. 1 of the drawing shows an optical fiber with a CCD jacket. The fiber includes a core 10 that has an index of refraction higher than the index of refraction of a cladding 12 circumscribing the core. Core 10 is also a good conductor of light waves. Next to cladding 12 is a CCD 14 layer having discrete pixels 15. Pixel width is determined by the required resolution of stress location along the optical fiber.

A light source 16 is located at one end of the fiber, and may provide a single pulse of light, a plurality of light pulses, or any combination thereof which inserts sufficient light energy to produce detectable light at stress locations. This is possible because the CCD pixels integrate the light energy they receive. The device of FIG. 1 also includes a means 18 for measuring the output of the CCD pixels.

Figure 3:
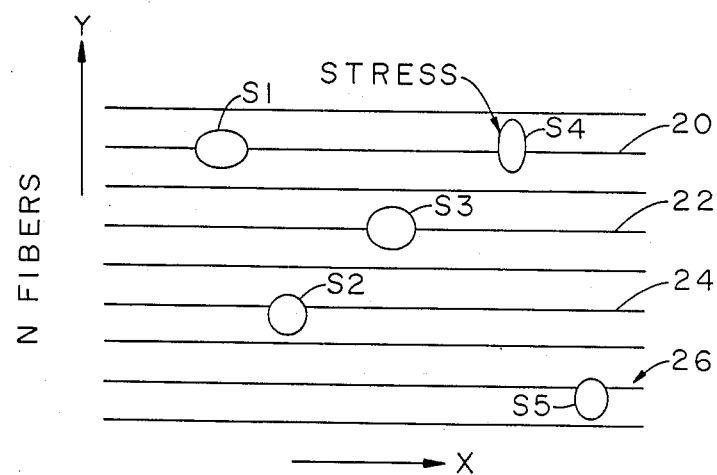
FIG. 3 shows schematically a uni-axial array of parallel fibers capable of two-dimensional x-y mapping of stress and temperature.

FIG. 3 shows an uni-axial array of optical fibers. The fibers are impregnated into a matrix composite sheet (not otherwise shown) which allows the two-dimensional (xy) surface of the sheet to be completely mapped for strain measurements. The Y position on the array is defined by each fiber while the X position is defined by the particular CCD pixel of a given fiber. This eliminates any need of an orthogonal array of fibers. The fibers of the array can be optically pulsed simultaneously or sequentially. For simultaneous light pulsing the stress image that exists at any given time creates an immediate electronic snapshot of the surface. Sequentially pulsing each fiber creates the same snapshot after all fibers have been pulsed.

In FIG. 3 stresses S1 and S4 are shown on an optical fiber 20, the locations of which are determined uniquely because of the use of CCD technology. Current technology utilizing interferometry or optical time domain reflectometry is not capable of resolving the location of two nearby stress points on a single fiber. The CCD outputs from the fiber array of FIG. 3 may be serially fed into a common amplifier and common signal processing electronics (not shown). This approach can also be extended to three-dimensions by adding further layers of uni-axial fiber optic sensors, i.e., optical fibers with CCD pixels. By interrogating the fibers in a prescribed manner, the three-dimensional data can be preserved.

Signal level from the fibers can be enhanced by increasing the on-time of the light pulse of 16, or by allowing each pixel 15 to integrate its signal resulting from a sequence of light pulses. This allows the detection of extremely small values of stress and provides operation over a wide dynamic range of signals.

Normally, CCDs at room temperature and above exhibit significant dark current. The dark current doubles for every 7° to 10° C. increase in temperature. During the time that there is no light pulse transmitted down the fiber, the CCD pixels can be detecting dark currents along the fiber. Pixel dark current is directly proportional to the temperature of the pixel. This data may then be shifted out of the CCD and provides direct temperature mapping of the temperature along the fiber. This use of dark current may also be expanded to the use of multiple fibers, and can provide a mapping of a sheet surface temperature.

Temperature data during mapping of a surface serves two purposes, namely, (1) surface temperature is provided; and (2) stress data may be corrected for temperature.

Pixel dynamic range as determined by thermodynamic noise is typically 1000:1. Therefore a temperature of 100° C. can be accommodated by this dynamic range.

Because CCDs have high sensitivity to light, substantial signal sensitivity is achieved by the invention. In a 30-foot length of optical fiber with a core diameter of 100 um and an attenuation of ten decibels per kilometer (db/km), the light signal received at the end of the fiber is attenuated by 0.1 db (2%). Therefore, in this 30-foot section of optical fiber, the attenuation may be considered negligible. A 5 mW laser diode coupled to a single fiber with a 50% coupling efficiency, produces a power density within the fiber of:

$$\frac{P}{A} = 0.5 \times \frac{5 \text{ mW}}{(\pi/4)(100 \text{ um})^2} \times \frac{(104 \text{ um})^2}{(1 \text{ cm})^2} = 32 \text{ W/cm}^2 \quad (1)$$

If any array of 1,000 fibers is driven simultaneously by the 5 mW laser diode, the power density in each fiber is:

$$\frac{P}{A} = 32 \text{ W/cm}^2 \times \frac{1}{1000 \text{ fibers}} = \frac{32 \text{ mW/cm}^2}{\text{fiber}} \quad (2)$$

A typical CCD pixel saturation exposure (Esat) is 0.45 micro joules per centimeters squared (uj/cm$^2$). If integration over a time of 40 ms is used, then the following equation gives the saturation power per pixel:

$$\frac{P_{sat}}{A} = \frac{E_{sat}}{t_{int}} = \frac{0.45 \text{ uj/cm}^2}{0.04 \text{ sec}} = 11 \text{ uW/cm}^2 \quad (3)$$

The ratio of available power in a fiber to the power density required to saturate a pixel is as follows:

$$\frac{\text{Power Density Available in Fiber}}{\text{Power Density to Saturate pixel}} = \frac{32,000 \text{ uW/cm}^2}{11 \text{ uW/cm}^2} = \frac{3000}{1} \quad (4)$$

Therefore, if the stress in a fiber, as described above, causes 1/3000 of the light to escape from the fiber, this would be sufficient to saturate the pixel at that location.

By the use of this invention, high speed stress mapping can provide dynamic stress data. The pixels can be scanned at a rate of up to 10 MHz. For example a 30 by 10 foot surface with one pixel per square centimeter requires 278,709 pixels with a total scan time of 28 ms per snapshot. If a 40 ms exposure time is used for all pixels simultaneously, an effective data rate of 12 snapshots per second is possible. This relies upon the ability of the CCD to receive new exposure information during the period old data is being scanned out of the shift register.

In order to provide accurate stress data, the effect of temperature must be subtracted from the stress data. This requires that a first measurement be made of the dark current, and a second measurement during energization of the fiber by a light source. When both measurements are completed, the temperature data is subtracted from the light excitation data, and stress reading is the result.

In conclusion, the present invention provides (1) two dimensional stress mapping of a surface, providing both amplitude and location of multiple stresses existing within a surface, (2) a response time sufficiently fast to allow mapping of dynamic stresses, (3) temperature mapping of a surface provided by inherently available dark current in the CCD structure, (4) only a uni-axial layer of sensing fibers is required for two dimensional mapping, and (5) small signal levels are easily amplified.

What is claimed is:

1. An apparatus for measuring bending imposed on an optical fiber comprising:
   means for passing light through the fiber,
   a light sensing layer located on the surface and along the length of said fiber for sensing the magnitude of light escaping from the fiber as a function of the location of bending, and
   means for scanning the light sensing layer to determine the location of bending.

2. The apparatus in accordance with claim 1 including means for receiving analog information from the light sensing layer and for converting the same to a video data format.

3. The apparatus of claim 1 in which the light sensing layer is a jacket of material encircling the optical fiber.

4. The apparatus in accordance with claim 1 wherein the light sensing layer is a charge coupled device.

5. The apparatus of claim 4 in which the charge coupled device includes a charge coupled analog shift register.

6. The apparatus in accordance with claim 5 wherein the charge coupled device and analog shift register are integrated circuitry located along the surface of said fiber.

7. An apparatus for measuring light escaping from an optical fiber comprising:
   means for passing light through the fiber,
   a light sensing layer located on the surface and along the length of the fiber for sensing the magnitude of light escaping from the fiber as a function of the location of the escaping light, and
   means for scanning the light sensing layer to determine the location of the escaping light.

8. An apparatus for measuring stress imposed upon an optical fiber comprising:
   means for passing light through the fiber,
   a light sensing layer located on the surface and along the length of the fiber for sensing the magnitude of light escaping from the fiber as a function of the location of the stress; and
   means for scanning the light sensing layer to determine the location of the stress.

9. Apparatus for measuring the temperature along an optical fiber comprising:
   a charge coupled device located along the length of said fiber, said device being comprised of a plurality of discrete pixels,
   means for scanning said pixels to detect dark current in each of said pixels, and
   means for converting said detected dark current to a temperature value.

10. Apparatus for accurately measuring stress of an optical fiber having a charge coupled device and shift register located along its length, comprising in combination:
    means for measuring the output of said the charge coupled device after light has been passed through said optical fiber,
    means for measuring the output of the charge coupled device when no light is present and only dark current of the charge coupled device can be measured, and
    means for subtracting the measured dark current output from the fist measured charge coupled output to determine the portion of the measured output which represents the stress in the optical fiber.

11. A method of measuring stress imposed upon an optical fiber comprising:
    passing light through the fiber,
    locating a layer of light sensing material on the surface and along the length of the fiber,
    using said light sensing layer to detect the location and amount of the light escaping from the fiber as a function of the location and amount of stress imposed on the fiber.

* * * * *